United States Patent [19]

Carpenter

[11] 4,273,189

[45] Jun. 16, 1981

[54] METHOD AND APPARATUS FOR RECOVERING NATURAL GAS FROM GEOPRESSURED SALT WATER

[76] Inventor: Neil L. Carpenter, 392 Englewood, Kerrville, Tex. 78028

[21] Appl. No.: 89,287

[22] Filed: Oct. 30, 1979

Related U.S. Application Data

[63] Continuation-in-part of Ser. No. 914,879, Jun. 12, 1978, abandoned.

[51] Int. Cl.³ .................. B01D 19/00; C02F 1/46; C25B 1/04; E21B 43/40
[52] U.S. Cl. .................................. 166/266; 55/2; 55/55; 60/641 D; 166/65 R; 166/75 R; 166/267
[58] Field of Search ............... 166/267, 266, 65 R, 166/75 R, 57, 60, 52; 60/641; 55/2, 52, 55

[56] References Cited

U.S. PATENT DOCUMENTS

| | | |
|---|---|---|
| 3,783,943 | 1/1974 | Schievelbein ..................... 166/266 |
| 3,862,545 | 1/1975 | Ellis et al. ........................ 60/641 |
| 3,951,794 | 4/1976 | Swearingen ..................... 60/641 X |
| 4,043,129 | 8/1977 | McCabe et al. ................. 166/314 X |
| 4,059,156 | 11/1977 | Berg ................................. 166/314 |

OTHER PUBLICATIONS

Uren, L. C., *Petroleum Production Engineering, Oil Field Exploitation*, 3rd Ed., McGraw-Hill Book Co., N.Y., 1953, pp. 575-582 and 707.

*Primary Examiner*—Stephen J. Novosad
*Attorney, Agent, or Firm*—Darryl M. Springs

[57] ABSTRACT

Method and apparatus for recovering natural gas from geopressured salt water by discharging the geopressured salt water from the subsurface strata into a variable volume tank at substantially atmospheric pressure. By flowing the discharged salt water over a plurality of mechanical baffles prior to entry of the salt water into the interior of the variable volume tank, release of the gas dissolved in the salt water is enhanced. In addition, electrodes are positioned in the path of the salt water flowing through the baffle area, and an AC electric current is established therethrough which aids in the release of additional hydrocarbon gases from the salt water. The pressurized hot salt water may also be utilized to generate electrical or mechanical energy before or after the release of the dissolved gases.

56 Claims, 9 Drawing Figures

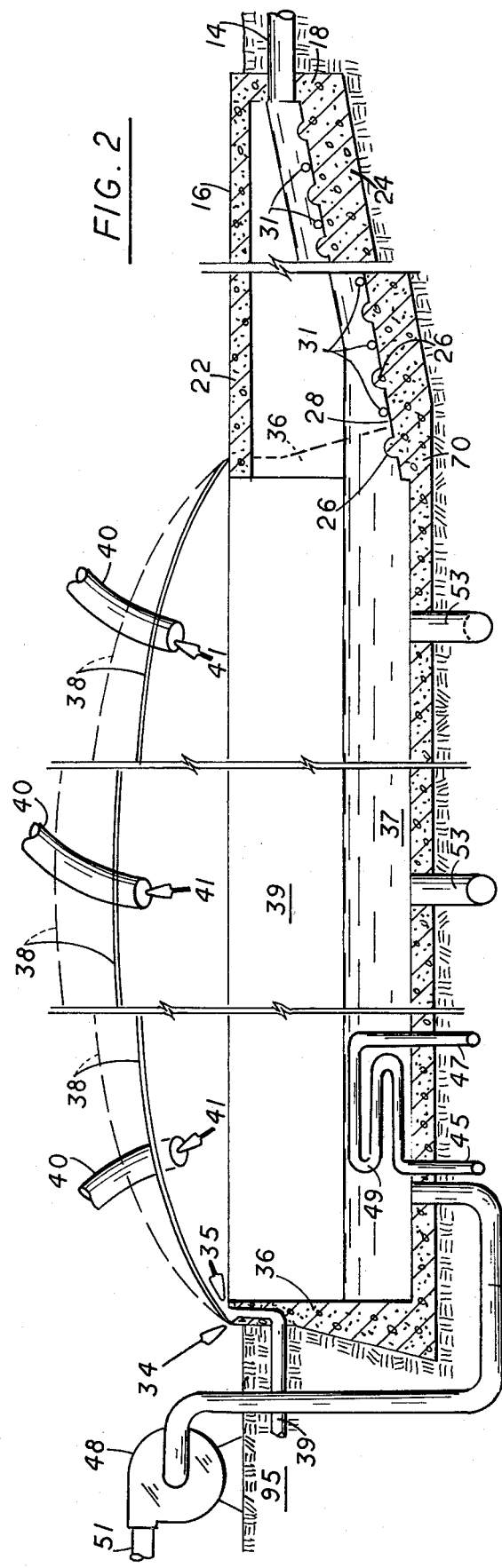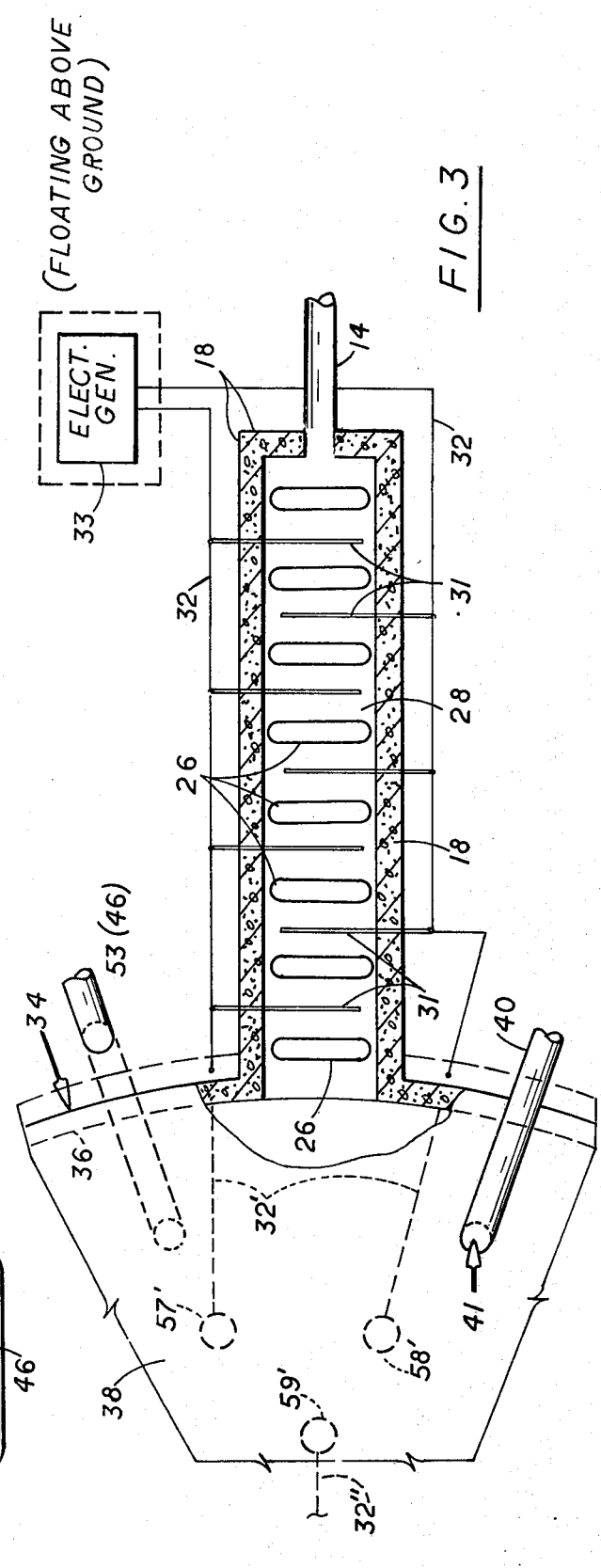

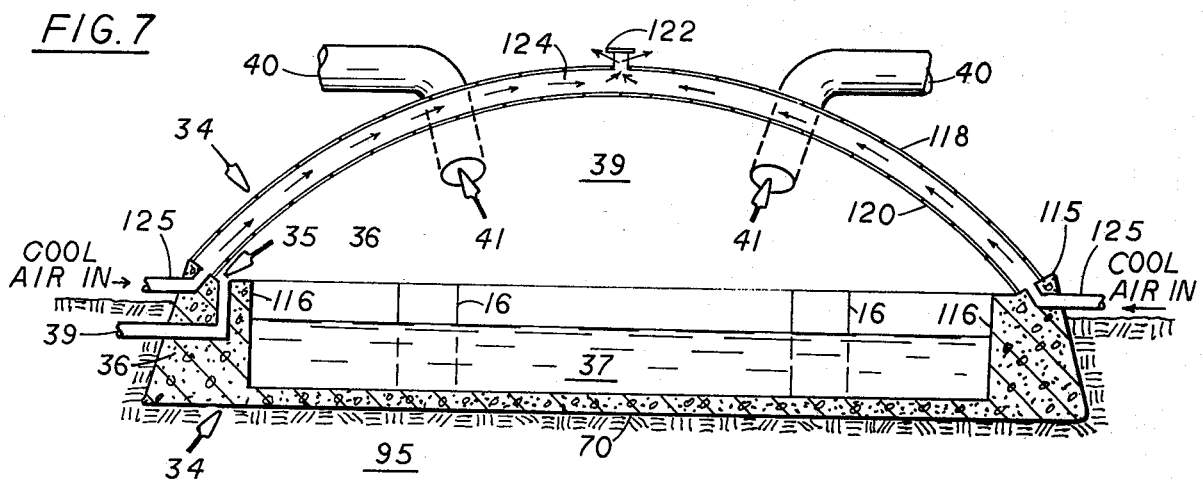
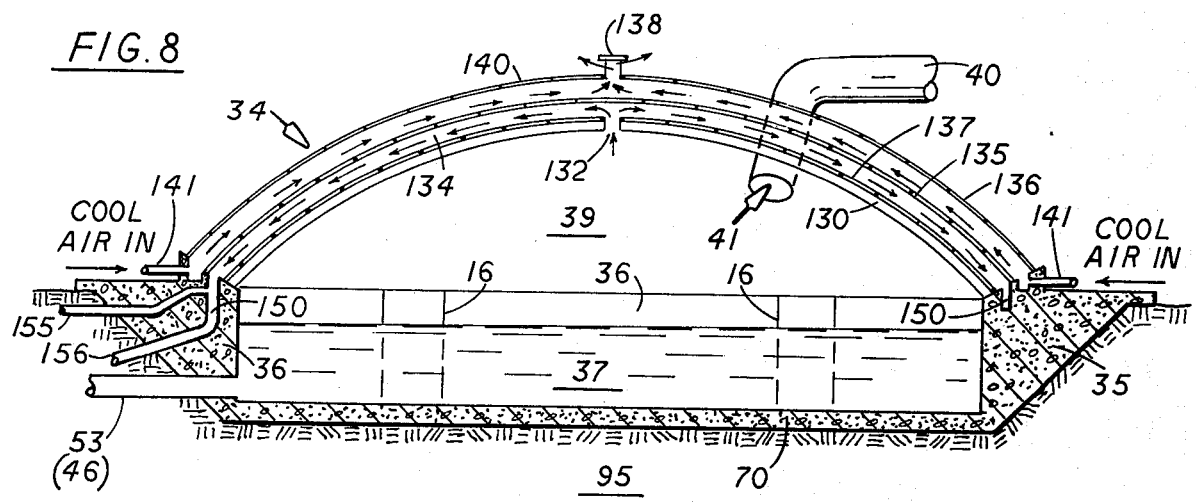
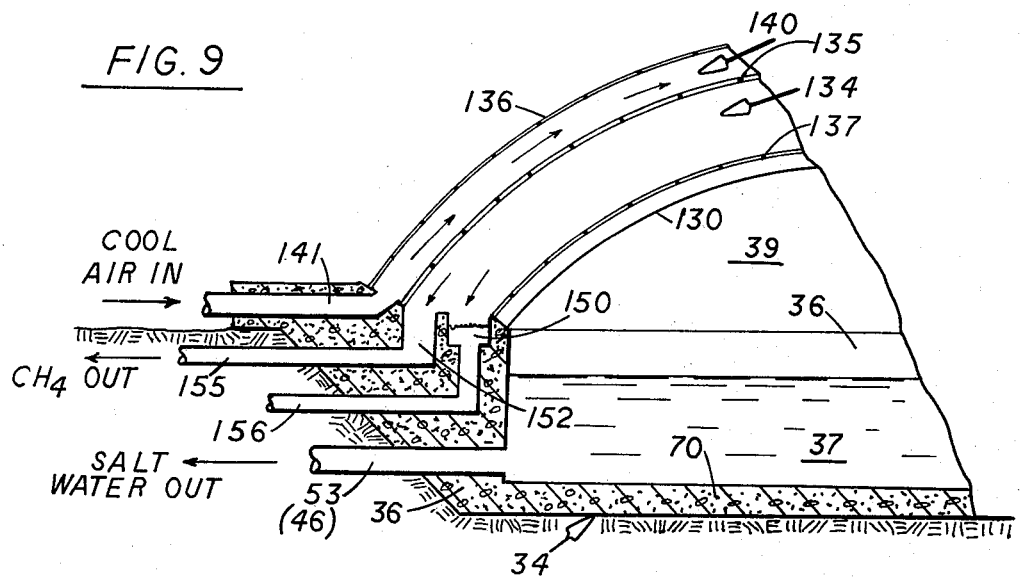

METHOD AND APPARATUS FOR RECOVERING NATURAL GAS FROM GEOPRESSURED SALT WATER

CROSS-REFERENCE TO RELATED APPLICATION

This application is a continuation-in-part of application Ser. No. 914,879, filed June 12, 1978, now abandoned.

BACKGROUND OF THE INVENTION

This invention relates to methods and apparatus for recovering gases, principally hydrocarbon gases, from geopressured, hot salt water, and in particular relates to methods and apparatus for recovering hydrocarbon gases dissolved in geopressured, hot salt water by substantially reducing pressure on the hot salt water and trapping the released gases. In addition, establishing an electric current flow through the salt water aids in the disassociation of additional hydrocarbon gases from the water. Additionally, method and apparatus are provided for recovering thermal energy from the hot salt water for conversion into electrical and mechanical energy.

There is a known sub-surface belt roughly 200 miles wide stretching from New Orleans, La. to Brownsville, Tex., which has underground formations containing geothermal salt water in which is dissolved large quantities of hydrocarbon gases. The salt water is trapped at depths of 10,000 feet or greater, and the great pressure in the earth's crust at those depths have caused large quantities of hydrocarbon gases to be dissolved in the salt water. Additionally, the pressures at those depths have caused an elevation in the temperature of the water ranging upwards of 300° F.

A U.S. geological study estimated that the geothermal hot salt water under Texas and Louisiana contains 24,000 quads of methane gas within drilling range, but some experts say that there is more than that. A "quad" is a macro-unit of measurement that represents one quadrillion British Thermal Units (BTU). A BTU is the amount of heat it takes to raise the temperature of a pound of 39° F. water 1° Fahrenheit. Thus, a quad is roughly equal to the BTU's in 170 million barrels of oil, or a trillion cubic feet of natural gas.

The geopressured area has been precisely defined by the more than 300,000 oil and gas exploration boreholes which have been drilled in Texas and Louisiana since 1920. Additionally, and before instruments were perfected for early detection, hitting the geothermal area unexpectedly was disastrous in drilling an oil or gas well. Sudden entry into subterranean strata and encountering pressures of 11,000 pounds per square inch or more often resulted in a violent blow-out, completely clearing the borehole of drill stem and casing.

There still are some problems, since engineers and geologists still do not know exactly how much gas there is, or exactly at what depth it is, or whether the water everywhere within the belt in saturated with gas, or whether some water has just small amounts of gas. Further, geologists and engineers do not know the temperature of the water in all areas, nor how saline the water is, and whether the salinity changes from place to place. In saturated salt water, gas content has been found to range from 6.7% to 11%. At a recent geothermal well under test in Louisiana, the water temperature, when brought to the surface was 220° F., 8° above the boiling point. The temperature is important because, in addition to gas, thermal energy may be retrieved from the hot water for use in other ways to produce energy for industrial application. For instance, heat diverted into freon boilers could turn turbines and thus generate electricity. Additionally, the salt water must be reinjected into the formation in order to maintain the geopressure therein to prevent land subsidence caused by the removal of the pressurized water and to meet environmental restrictions on the disposal of salt water.

The prior art technology presently being utilized requires that the hot geopressured salt water be first introduced into a first pressurized tank that would allow some of the dissolved natural gas to be freed by lowering the pressure from approximately 11,000 psi to about 6,000 psi. Then the pressure in the tank would be lowered again to about 3,000 psi to allow more gas to evolve until the largest percentage of gases can be obtained, and then the high temperature water can either be reinjected into the formation or applied to suitable means for converting the heat into electrical or mechanical energy and then the water would be reinjected into the subsurface formation.

One disadvantage of the fixed containers utilized in the prior art is the large margin of safety which must be built into the containers to accommodate overpressurization resulting from large, sudden increases in pressure as often occur when a large high-pressure "slug" of gas is produced. A second disadvantage of the prior art is the complex apparatus required to permit successive reductions in the pressure without losing the gases produced by the initial reduction in pressure.

The present invention overcomes the deficiencies of the prior art by providing methods and apparatus for permitting a direct reduction to atmospheric pressure of the geopressured hot salt water, thereby maximizing the release of hydrocarbon gases contained therein.

SUMMARY OF THE INVENTION

The present invention provides method and apparatus for recovering gases, principally hydrocarbon gases, dissolved in hot geopressured salt water. A variable volume chamber comprising a large circular tank with a flexible "umbrella" cover is provided to receive the hot geopressured salt water discharged from a borehole for depressurizing the geopressured salt water to essentially atmospheric pressure, thus permitting the dissolved gas to freely disassociate from the salt water. Further, the salt water is subjected to mechanically-induced turbulence prior to entry into the variable volume chamber for enhancing the release of the dissolved hydrocarbon gases. Additionally, an electric current flow is established through the salt water during the mechanically-induced turbulence for aiding in further release of dissolved hydrocarbon gases through electrochemical action.

The hot salt water may then be reinjected into the underground formation or pumped into storage tanks containing a plurality of electrodes which permit an electric current flow to be established within the tank, further releasing additional gases through electrochemical disassociation of the gas with the salt water. The electrical current flow in the salt water also elevates the temperature of the salt water and means are provided for converting the thermal energy of the hot salt water into electrical or mechanical energy. Afterwards, the salt water is injected back into the formation. In addition, salt water recovered in conventional oil production can be separated and treated by use of electrical current to release residual dissolved gases where it is found to be practical and economical.

Where the geopressured salt water temperatures are in excess of 200° F. upon recovery from the borehole, the pressure on the salt water could be maintained, preventing gas evolvement, and the hot pressurized salt water could be applied to turbines, heat exchangers and other means to initially convert the mechanical (pressure) and thermal energy to electrical or mechanical energy before the gases are released.

Accordingly, it is a feature of the present invention to provide method and apparatus for recovering dissolved hydrocarbon gases from geopressured salt water by rapidly reducing the pressure on the salt water to near atmospheric pressure in a single vessel.

It is a further feature of the present invention to provide method and apparatus for enhancing recovery of hydrocarbon gases dissolved in geopressured salt water by subjecting the salt water to mechanical turbulence, further releasing dissolved hydrocarbon gases within the water.

It is still another feature of the present invention to enhance recovery of hydrocarbon gases from geopressured salt water by establishing an electric current flow through the salt water.

It is yet another feature of the present invention to recover mechanical (pressure) energy and thermal energy from the salt water for conversion to the electrical and mechanical energy.

These and other features and advantages of the present invention will become apparent from the following detailed description when considered in conjunction with the accompanying drawings.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted however, that the appended drawings illustrate only typical embodiments of the invention and therefore are not to be considered limiting of its scope when the invention may admit to further equally effective embodiments.

In the drawings:

FIG. 2 is a vertical cross-sectional view of the variable volume chamber and the entry chamber of the system depicted in FIG. 1.

FIG. 3 is a top view, partly in cross-section, of the variable volume chamber and the entry chamber as shown in FIG. 1.

FIG. 7 is a vertical cross-sectional view of another embodiment of the variable volume chamber showing means for cooling the trapped water vapor and gases.

FIG. 8 is a vertical cross-sectional view of yet another embodiment of the variable volume chamber showing means for cooling the trapped water vapor and gases and recovery of fresh water.

FIG. 9 is a partial vertical cross-sectional view of a portion of the variable volume chamber shown in FIG. 8.

DETAILED DESCRIPTION OF THE PREFERRED EMBODIMENT

Geologists and petroleum engineers have estimated that the geopressured salt water contained in the United States "Gulf Coast" geothermal belt typically contains about 70 cubic feet of natural gas per barrel of salt water. Thus, it may be seen that a well typically producing 50,000 barrels of water a day could produce 3,500,000 cubic feet of natural gas each day and 20 such wells could produce 70,000,000 cubic feet of gas per day. However, handling and treating such a volume of hot pressurized water and released gases will require a specialized approach to the problem.

Figure 1:
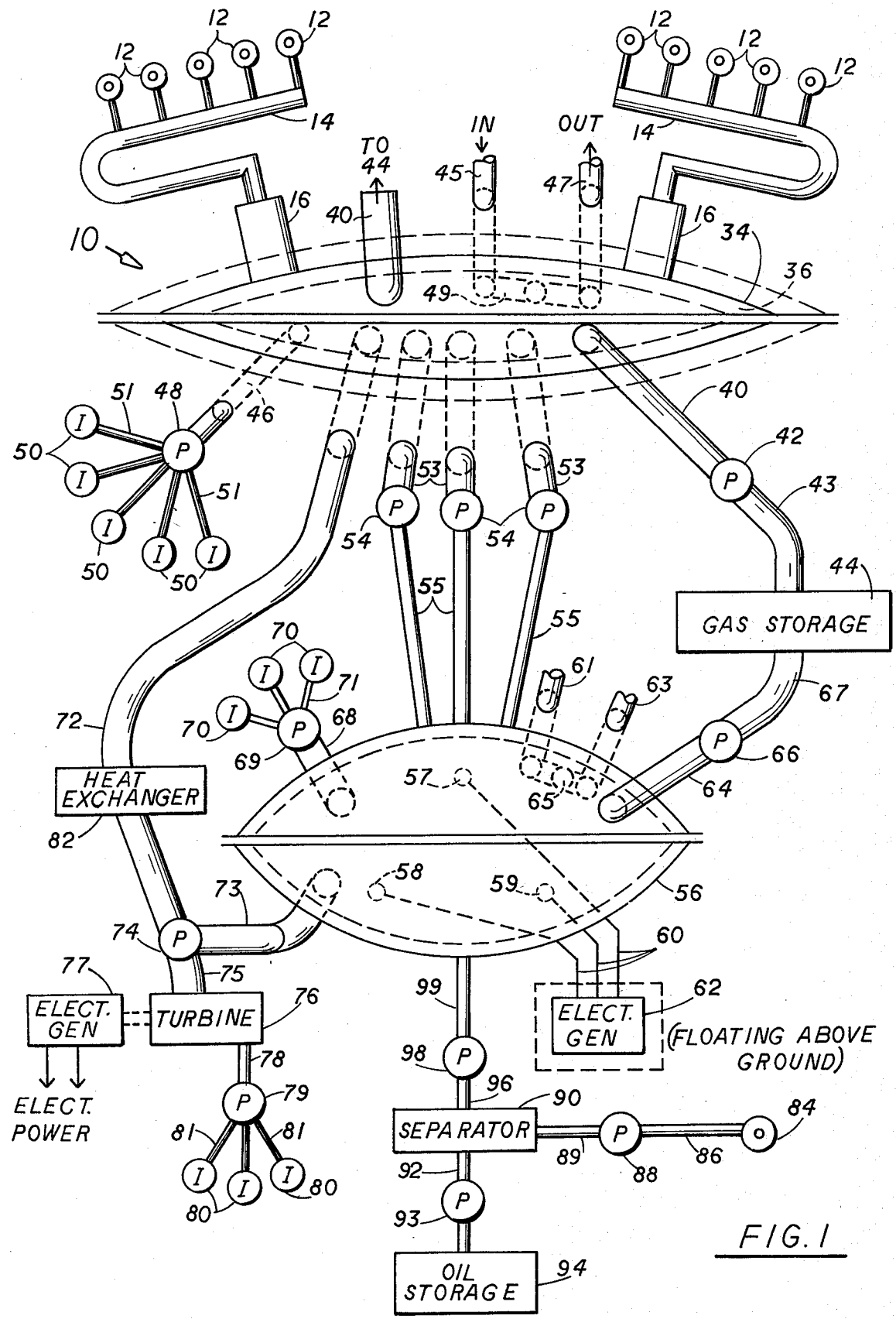
FIG. 1 is a diagrammatic top view illustrating a system for recovering hydrocarbon gases dissolved in geopressured salt water and from salt water separated from oil in conventional production.

Referring now to FIGS. 1, 2 and 3, a system 10 for recovering the natural gas contained in geopressured salt water is shown. Hot geopressured salt water from a plurality of wells 12, extending into the subsurface geopressured formation, is introduced through piping 14 into the interior of a closed chamber 16 which comprises side and end walls 18, a base or floor member 24 and a top or ceiling member 22. One end of chamber 16 communicates with a variable volume collection tank 34 having side walls 36 and a flexible "roof" or "cover" 38.

Collection tank 34 may conveniently be a circular structure constructed of reinforced concrete or other suitable material, having a substantial portion of wall member 36 disposed below ground level as is the floor member 70. A flexible covering 38 is attached to the upper extremity of wall 36 and is preferably made of a gas tight, flexible material that will expand or contract depending upon the gas pressure in the interior 39 of tank 34 and hence exerted on covering 38. Cover 38 may conveniently be any flexible fabric, such as nylon, Mylar or any suitable material that will be both flexible, lightweight, impervious to the passage of natural gas therethrough, will not create a static electricity capacity effect and will not be affected by extremes of temperature and natural exposure to ultraviolet light from the sun. Although for some embodiments, top 38 could be a fixed dome or cover, it would have to be able to withstand abrupt changes in pressure and the structural safety problems and increased costs may not outweigh the benefits of a flexible cover.

The walls of tank 34 are shown partially disposed in the ground for a couple of reasons. First, since the tank size is relatively large, i.e., typically 1000 feet in diameter, with 8 to 10 foot walls, submerging the tank in the ground saves construction costs and helps provide insulation for the tank to minimize heat transfer through the tank walls 36. Further, inlet pipe 14 may be disposed underground and/or insulated to minimize heat loss during the transfer of the hot geopressured water from well 12 to tank 34.

Hot geopressured salt water entering inlet chamber 16 through pipe 14 spills out onto a top surface 28 (see FIGS. 2 and 3) of a ramp 24 formed in inlet expansion chamber 16 with the lower end of ramp 24 terminating at the point of communication with the interior 39 of tank 34. The slanted ramp surface 28 has disposed thereon a plurality of spaced and raised baffles 26 for causing turbulence in the geopressured salt water as it travels down the ramp 24 to the collecting tank 34. Vertically spaced above ramp surface 28 and horizontally disposed in a parallel, spaced relationship to surface 28 are a plurality of electrodes 31 that project into the interior of chamber 16 and are submerged in the flow of the hot salt water as it flows down ramp 24 from pipe 14. The electrodes 31 are interconnected by conductors 32 to an AC electrical power source 33 for purposes to be hereinafter explained. It is critical that the electrical power source 33 is "floating" above ground potential.

Figure 4:
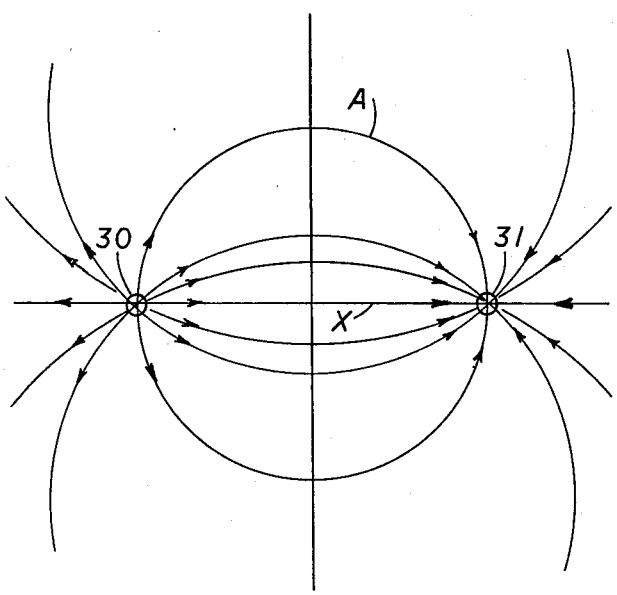
FIG. 4 is a diagrammatic view illustrating typical alternating current distribution between two spaced electrodes.

As the hot geopressured salt water enters through pipe 14 into the interior of chamber 16, the lower pressure within chamber 16 allows the dissolved hydrocarbon gases to immediately "bubble" out of the salt water and escape to the upper portion of chamber 16 to be routed to the interior 39 of tank 34. The hot salt water as it rushes down the inclined surface 28 of ramp 24 must pass over baffles 26 which cause mechanical turbulence in the water to aid in the release of additional dissolved gases. The electrodes 31 produce an AC electrical current flow through the salt water in chamber 16 along lines or current paths such as shown in FIG. 4, for aiding in further release of hydrocarbon and other gases by processes and theories previouly disclosed in U.S. Pat. No. 4,037,655, which issued July 26, 1977.

As a result of formal laboratory studies, it has been found that methane, ethanes and butanes plus are all soluble in an aqueous solution containing salt and carbonates, and this is true even though the solution is not under pressure. As disclosed in U.S. Pat. No. 4,037,655, passage of AC electrical current through the solution will release the dissolved gases as free gases, and will further release free hydrogen and carbon dioxide. Therefore, in addition to recovering vast amounts of hydrocarbon gases, a lesser quantity of hydrogen and carbon dioxide can be recovered, both of which have important industrial and tertiary oil recovery uses.

The hot salt water 37 flows down the surface 28 of ramp 24 into tank 34 as shown in FIG. 2, and is then pumped by means of a plurality of outlet pipes 46 and pumps 48 to injection wells 50 via piping 51 for injecting the salt water back into the geopressured formation. Alternatively, the salt water may be pumped through pipes 53 by pumps 54 to a secondary processing and storage tank 56. Natural gas liberated from salt water 37 within tank 34 collects in the upper portion 39 of tank 34 as shown in FIG. 2, and as the gas volume and pressure increases, the flexible cover 38 expands upward to its fully extended position, shown by the dotted lines 38 in FIG. 2. The low pressure gas would be removed through the spaced openings 41 of tubes 40 formed in the cover 38 by suitable pumping or compressing equipment 42, for compression and storage in conventional storage containers or tanks 44 and thereafter processed by conventional methods.

Since the salt water from a geopressured well may have a temperature of 200° F. to 300° F., a substantial amount of water vapor will also be present in the interior 39 of tank 34 and must be removed by separator means (not shown) before the hydrocarbon gases are compressed for storage or shipment. Another alternative is to discharge the hot salt water from variable volume container 34 through pipes 72 and 75 and pumps 74 as an input to turbine 76 or a heat exchanger 82 or the like for conversion of the thermal energy of the hot salt water into electrical or mechanical energy. Such a turbine 76 or conversion means may conveniently be a closed-cycle two phase gas turbine using freon as the heat-exchange fluid medium, and the turbine may be used to drive an electrical power generator 77. The salt water may then be pumped from the turbine 76 through pipe 78 by pump 79 through pipes 81 and injected into the subsurface geothermal formation through injection wells 80.

Figure 5:
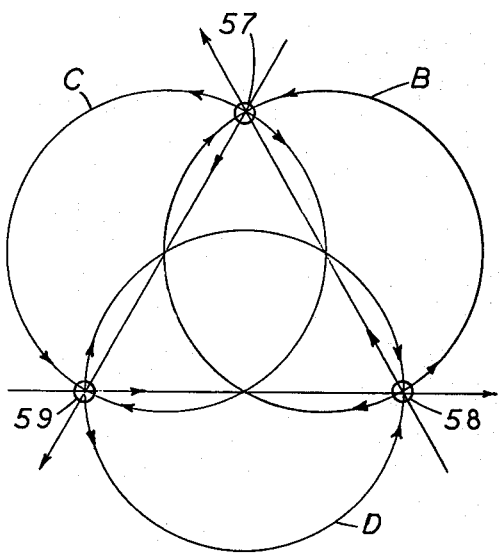
FIG. 5 is a diagrammatic view illustrating a typical three-phase alternating current distribution between three spaced electrodes.

Referring in particular to FIG. 1, there are shown three electrodes 57, 58 and 59 positioned in tank 56 which are connected by conductors 60 to an electrical power generator 62, which also must "float" above ground potential. The tank 56 must be insulated from ground potential also. The electrodes 57, 58 and 59 produce an electrical current flow in the salt water 37 pumped into tank 56 from tank 34 and have current paths such as are shown in FIG. 5. The AC electrical current aids in further release of hydrocarbon and other gases by the process and theories hereinabove described. The released gases are recovered from tank 56 through duct 64 communicating with the interior of tank 56 by means of a pump 66, interposed between duct 64 and pipe 67, for compression and storage in a conventional storage tank 44 for purposes hereinabove described. As additional gas is released from the salt water, the salt water may then be removed from tank 56 by pump 69 interposed in a pipe 68 interconnecting the interior of tank 56 with injection wells 70 through pipes 71.

The hot geopressured salt water, when first recovered from wells 12, will typically have a temperature ranging from 200° F. to 300° F. as hereinabove mentioned, but may lose heat in the gas evolution process and transfer to gas collection tank 34 and secondary collection and storage tank 56 unless all tanks and piping are fully insulated. However, as has been described in the above-mentioned patent, U.S. Pat. No. 4,037,655, the AC electrical current flow between electrodes 57-59 generates heat, further elevating the temperature of the salt water in tank 56 such that the temperture can be maintained in a range of at least 165° F. to 210° F. for maximum gas evolution but short of producing steam. Recovery of the thermal energy contained in the salt water in tank 56 may be achieved in various manners, for example, pumping the hot salt water out of tank 56 through pipe 73 by means of pump 74 interposed therein, and into a turbine 76 or heat exchanger (not shown) or the like for removal of the mechanical and thermal energy and conversion thereof into electrical or mechanical energy above described. In addition, heat exchanger coil(s) 65 may be disposed inside of tank 56 and the hot salt water therein for heating a suitable fluid flowing in pipes 61 and 63 for converting the thermal energy of the hot water in tank 56 to mechanical or electrical energy. In addition, heat exchanger device or coil 49 may be disposed in the hot salt water in main tank 34 for heating a suitable fluid flowing in lines or pipes 45 and 47 for converting thermal energy of the hot salt water into electrical or mechanical energy.

In many cases, the geopressured water wells 12, and therfore system 10, may be adjacent to producing oil wells such as a well 84. Commonly, in most oil fields, connate water (usually salt water) will be recovered from the oil bearing formation with the oil produced therefrom. Oil produced from subsurface formations is conventionally pumped from the well 84 through pipe 86 by a pump 88 into a conventional separator 90 where the oil and water mixture is separated into the oil and water component parts. The oil is then transferred through a pipe 92 by a pump 93 to an oil storage tank 94. Heretofore, disposal of the salt water was often accomplished by being injected back into the oil bearing formation. Accordingly, it is within the purview of the present invention that the salt water separated from the oil may be pumped from separator 90 through pipes 96 and 99 by pump 98 into the secondary collection tank 56 for processing as has been heretofore described, since such connate salt water will often have some dissolved hydrocarbon gases that can be liberated by the above-described process in tank 56. Accordingly, it may be advantageous to provide additional injection wells 70 communicating with the oil bearing strata to provide a return to the oil bearing zone rather than the salt water geopressured strata in order to help maintain the oil formation pressure.

As earlier mentioned, tank 34 may conveniently have a 1,000 foot diameter, 10 foot walls 36 and a flexible cover 38 that "balloons" to about 45 feet at the center of the tank. The "ballooning" or "flex" of cover 38 provides nearly instantaneous change in the volume of tank 34 to accommodate large pressure increases. Such a tank would have a volume in excess of 25,000,000 cubic feet. Accordingly, a number of wells 12, possible up to 20 or more in number, may be utilized to supply the hot geopressured salt water to chamber 34. Tank 56 may be similar in basic construction to tank 34 but need not be as large, nor does it have to have a flexible top or cover, since the small additional quantities of gas recovered in tank 56 will only be a fraction of the initial gas evolution in tank 34.

It is possible that as production of a geopressured salt water well progresses, that a lower quantity of salt water will be produced, but that large "slugs" of gas will be recovered thus raising total gas production but lowering salt water production. These "slugs" may in part be caused by a low pressure area being created around the well bore when large quantities of water are produced at the surface, i.e., gas will travel through a rock matrix with more ease than will water. Hence, the gas begins to break out at a very rapid rate from the formation when large quantities of gas laden water are produced at the surface because of the lowering of the pressure in the formation around the borehole. When this gas begins to break out and the water/gas ratio changes, then even more gas will tend to break out below ground and, herefore, will actually form a low pressure "chamber" around the well bore thereby holding back, to a certain extent, the water, but forming large "slugs" of gas.

These gas "slugs" could cause large pressure variations in tank 34, thus the necessity for its variable volume capability as provided by the flexible cover 38. As the gas commences to produce in larger quantities, the low pressure "chamber" may still be lowered further and more gas will be able to "break" out, with intermittent smaller "slugs" of water/gas. It is possible that as the water production increases and the pressure in the formation drops, that additional gas laden salt water may be channeled into the formation from the Gulf of Mexico. It is believed that at depths of 15,000 feet or greater, 50,000 trillion cubic feet of methane is dissolved in the salt water of the Gulf of Mexico. If there is communication between the sea floor and the geopressured salt water strata under the Texas and Louisiana Gulf coasts, then such replacement of salt water from the ocean depths may be possible.

The salt water will also be heated in tank 34 by the evolution of the methane gas. There is very little attraction between methane molecules and water molecules, yet methane is slightly soluble in water. When the solubility of methane was closely studied, the reaction was found to release much more heat than predicted. The normal expectation was that the heat released in a reaction between solute and solvent will increase with the ease of solution. Thus, the expectation was that the dissolution of methane in, say, hexane (a substance in which methane is readily soluble) would release many times more heat than the dissolution of methane in water. Precisely the opposite has been found to be true. The dissolution of methane in water releases ten times as much heat as that of methane in hexane. Accordingly, as the methane and other hydrocarbon gases break out of solution under near atmospheric pressure in chamber 16 and tank 34, there should be heat generated that will increase the water temperature.

In addition, treating the water in expansion chamber 16 by the passage of AC electrical power therethrough as previously described, will add heat by electrochemical action. Methane is slightly soluble in water, due to a slight attraction between methane molecules and water molecules. However, it is known that carbonates and bicarbonates present in the water will increase the solubility of methane and other hydrocarbon gases in the water. In the formation matrix, the water molecules collect around methane molecules to form a cagelike film held together by hydrogen bonds. Since the water molecules have an unusually large dipole moment (1.8 Debye units), the molecules rotate in response to an impressed electric field. The exposed hydrogen protons of the water molecules turn toward the negative potential of the electrical field. This rotation of the water molecules in response to an electrical field can break the hydrogen bonds between the water molecules, thus releasing the methane molecule. This chemical action of releasing the methane molecules trapped in the salt water will also generate heat.

While the above embodiment 10 of the system utilizes electrodes 31 and 57–59 in tanks 34 and 56, respectively, the electrical power requirements will be surprisingly low. This is due to the effect which increased temperature has on the conductivity of electrolytes. Increases in temperature in metallic conductors decreases the conductivity of the conductor, thereby increasing resistance and causing greater power consumption. However, in electrolytes, the reverse effect is true, and the conductivity of the electrolyte solution (salt water being an excellent electrolyte) increases with temperature. For example, in ten gallons of 70° F. water an initial AC power application of 40 VAC and 20 amperes may drop to less than 0.5 ampere and 20 VAC when the water temperature reaches 180° F. to 212° F. Therefore, with the water having elevated temperatures (200° F. to 300° F.) to begin with, the power requirements for causing gas dissassociation and heating will be minimal.

While a preferred embodiment has been described above with regard to system 10, it can readily be seen that not all of the equipment associated with the above-described embodiment may be required at a particular location. Thus, it may be that a particular location only offers access to geopressured salt water, so that the oil/water separator 90 and storage tank 56 sub-assembly of system 10 may be unnecessary. Further, it may be seen that to enhance recovery of gas from the salt water recovered from the geopressured strata, the AC electrical generator 33 and associated conductors 32, 32' and 32" and electrodes 57', 58' and 59' may be disposed within tank 34 (See FIG. 3) and the water therein to establish the electrical current patterns depicted in FIGS. 4 or 5 within the recovered salt water to aid in additional release of gases. Further, in such a changed configuration, the turbine 76 may be interposed between pump 48 and the injection wells 50.

Additionally, in those locations where a geopressured salt water strata is unavailable, the embodiment may only include separator 90, process tank 56, the AC electrical generator 62 and electrodes 57, 58 and 59. In this configuration, the salt water separated from the oil is elevated in temperature by the current flow established between the electrodes within tank 56, with the elevated temperature fluid being passed through a freon heat exchanger or other suitable heat exchanger 65 to power the turbine 76 prior to injection into the oil-bearing formation through injection wells 80, or directly into injection wells 70.

Figure 6:
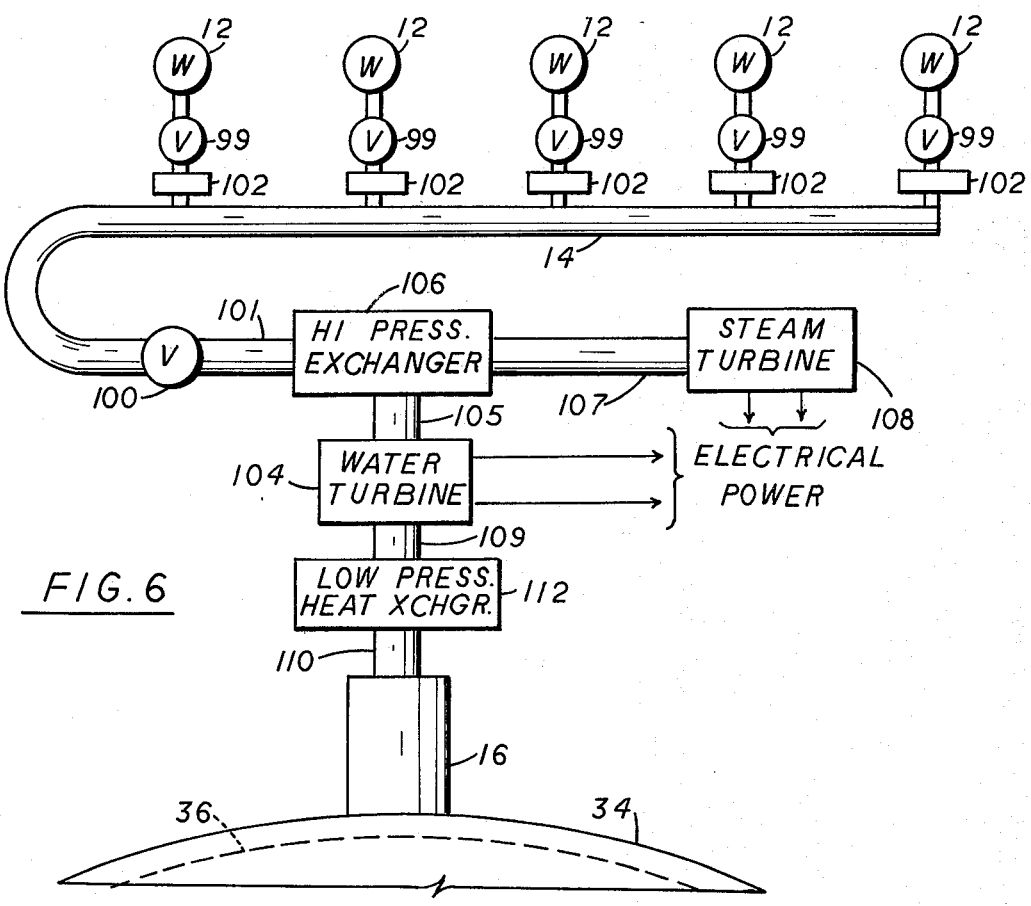
FIG. 6 is a diagrammatic schematic of a plurality of geopressured salt water wells commonly manifolded for application to means for converting thermal energy to mechanical and electrical energy prior to gas evolvement.

It may be preferable in some installations to utilize the system configuration of FIG. 6 where the pressure and thermal energy of the hot geopressured salt water may be initially converted into useful electrical and/or mechanical energy prior to release of the gases in expansion chamber 16 and tank 34.

The pressurized gas-laden salt water from a plurality of salt water wells 12 is shown manifolded in a common manifold pipe 14 through individual well head valves 99 and chokes 102 to maintain a constant differential pressure between the formation and manifold 14. The pressurized salt water is applied through another shut-off valve 100 and pipe 101 to a high-pressure heat exchanger 106 where the 200° F. to 300° F. salt water exchanges heat in a conventional manner to drive a steam turbine 108, for instance, and generate electrical power.

The hot salt water is discharged from heat exchanger 106 through pipe 105 to a water turbine 104 or other device for converting the pressurized salt water, often reaching pressure of 10,000 psi, to mechanical energy or to electrical power. The discharge from the turbine is through piping 110 into expansion chamber 16 and variable volume chamber 34, for purposes hereinabove described. The pressure differential between the input to the water turbine 104 and the interium of tank 34 must be maximized in order to achieve maximum efficiency of the water turbine.

Because of the high temperatures of the geopressured salt water, most likely usually over 212° F., it is estimated that 25% to 50% of the water will go into a heated water vapor state in the expansion chamber 16 and interior 39 of tank 34. Under usual weather and atmospheric conditions, a substantial amount of the water vapor will collect on the inner surface of flexible cover 38 and condense thereon and run down the downwardly sloping sides of cover 38. Accordingly, a collection channel 35 (See FIG. 2) could be disposed about the top rim of wall 36 to collect the condensed fresh water for transfer through pipe 39 for use in steam generating plant.

Another embodiment of tank 34 is shown in FIG. 7, and can be used to cool the gas/water vapor mixture in interior 39 of tank 34. Tank 34 is similar in construction to the embodiment of FIGS. 1, 2 and 3, having buried sidewalls 36 and a base 70 with a plurality of input expansion chambers 16. However, tank 34 has two spaced, flexible covers 118 and 120. The inner flexible cover 120 operates in identical fashion to cover 38 earlier discussed. However, the outer cover 118 is spaced from cover 120 and has cool air input means 125 radially disposed in the upper edge 115 of wall 36 of tank 34 to inject cooling air into the space 124 between covers 118 and 120. Centrally located in flexible cover 118 is a one-way valve 122 for permitting the cooling air injected at the periphery of covers 118 and 120 to escape to the atmosphere.

As the cooling air passes through space 124 it absorbs heat from the gases and water vapor in space 39 adjacent inner cover 120, causing some of the water vapor to condense on the inner surface of cover 120 and to trickle down the sides thereof. A channel 35 disposed about the rim of wall 36, similar to that above discussed with regard to FIG. 2, may be utilized to collect the condensed fresh water for transfer through pipe 39 for disposal or use. The outer surface of cover 118 may have a reflective coating to reflect as much heat from the outside as possible and minimize heat transfer through cover 118. Ducts 40 connected to openings 41 in cover 120 are utilized to carry away the gas and water vapor as hereinabove described, where the water vapor is separated from the hydrocarbon gases prior to gas compression and storage.

Since there is such a large quantity of water vapor predicted to be present, it may be practical in some applications to cool the water vapor and collect the condensed fresh water, which could be an important subsidiary source of fresh water. The embodiment of FIGS. 8 and 9 shows apparatus for collecting such fresh water. The tank 34 has side walls 36 and a bottom 70 partially buried in the earth 95, and has a plurality of input expansion chambers 16. However, this embodiment utilizes three, spaced, cover surfaces, the outer two, 135 and 136, functioning identically to flexible covers 120 and 118, respectively, in the embodiment shown in FIG. 7. Cooling air is blown between covers 135 and 136 by air ducts 141 and circulates through space 140 to escape through a one-way valve 138.

However, the lowest of the three covers 137 is supported in an upright position by ribs or frame 130. A central opening 132 in inner cover 137 permits the low pressurized gas and water vapor in the interior 39 of tank 34 to be forced through opening 132 and into the cooled space 134 between cover 137 and 135. The cooled water vapor in space 134 condenses unto the upper surface of cover 137 and drains down the outer surface of cover 137 to be collected by a water collection cannel 150 which is drained by pipe 156 to transport the fresh water to an outside station. The hydrocarbon gases, principally methane, (CH$_4$) pass through opening 152 between the peripheral edges of covers 135 and 137 to communicate to a transfer pipe 155 for separation, compression and storage.

Although specific embodiments have been described in detail hereinbefore, it is understood that the subject invention is not limited thereto, and all variations and modifications thereof contemplated are included within the spirit and scope of the invention as defined by the appended claims.

What is claimed is:

1. A method of recovering hydrocarbon gases from hot geopressured salt water, comprising the steps of
   recovering the geopressured salt water from a subsurface earth formation,
   discharging the geopressured salt water into a variable volume container at a substantially reduced pressure for causing release of hydrocarbon gases therefrom,
   agitating the geopressured salt water during said discharge step for enhancing release of the hydrocarbon gases, and
   recovering the released hydrocarbon gases.

2. The method described in claim 1, further including the step of establishing an electrical current flow through said salt water during said agitating step for further enhancing release of the hydrocarbon gases therefrom.

3. The method described in claim 2, wherein said electrical current is alternating current.

4. The method described in claim 3, wherein said alternating current is three-phase alternating current.

5. The method described in claim 1, further including the following steps inserted between said recovering and discharging steps,
   converting the thermal energy of said pressurized salt water into mechanical or electrical energy, and
   converting the mechanical energy of said pressurized salt water into thermal or electrical energy.

6. The method described in claims 1 or 5, further including the steps of
   electrically isolating said recovered salt water from which said hydrocarbon gases have been released,
   establishing an electrical current flow in said recovered salt water for causing additional disassociation of hydrocarbon gases therefrom, and
   recovering said additional disassociated hydrocarbon gases.

7. The method described in claim 6, wherein said electrical current flow also causes the generation of free hydrogen and carbon dioxide.

8. The method described in claim 6, wherein said electrical current is alternating current.

9. The method described in claim 8, wherein said alternating current is three-phase alternating current.

10. The method described in claim 6, wherein said electrical current flow established in said recovered salt water elevates the temperature thereof to a preselected temperature range.

11. The method described in claim 10, wherein said elevated temperature range is 180° F. to 212° F.

12. The method described in claim 10, further including the steps of
    recovering thermal energy from said elevated temperature salt water, and
    converting said thermal energy into electrical or mechanical energy.

13. The method described in claim 12, further including the step of
    injecting said salt water into said subsurface earth formation after recovering said thermal energy therefrom.

14. The method described in claim 6, further including the step of
    injecting said discharged salt water substantially free of hydrocarbon gases into said subsurface earth formation after recovering of said additional hydrocarbon gases.

15. The method described in claim 6, further including the steps of
    separating connate salt water containing dissolved hydrocarbon gases from crude oil recovered from a producing oil well, and
    combining said connate salt water with said recovered geopressured salt water prior to the step of establishing an electrical current flow therethrough.

16. The method described in claims 1 or 5, further including the step of
    injecting said recovered salt water substantially free of hydrocarbon gases into said subsurface earth formation after said recovery of said hydrocarbon gases.

17. The method described in claims 1 or 5, further including the steps of
    recovering thermal energy from said recovered hot salt water after release of said hydrocarbon gases therefrom, and
    converting said thermal energy into electrical or mechanical energy.

18. The method described in claim 17, further including the step of
    injecting said salt water into said subsurface earth formation after recovering of said thermal energy therefrom.

19. The method described in claim 1, wherein hot water vapor from said salt water condenses on at least a portion of the inner surface of said variable volume container and includes the step of collecting said condensed water vapor as fresh water.

20. The method described in claim 1, wherein hot water vapor from said salt water collects on the inner surface of the top of said variable volume container, and further includes the steps of
    cooling said top of said variable volume container to condense said water vapor on said inner top surface, and
    collecting said condensed water vapor as fresh water.

21. A method of recovering hydrocarbon gases from connate salt water associated with crude oil recovered from a producing oil well, comprising the steps of
    separating the connate salt water containing dissolved hydrocarbon gases from the recovered crude oil,
    electrically isolating said separated connate salt water,
    establishing an AC electrical current flow in said separated connate salt water for causing disassociation of hydrocarbon gases therefrom, and
    recovering said disassociated hydrocarbon gases.

22. The method described in claim 21, wherein said electrical current flow also causes the generation of free hydrogen and carbon dioxide.

23. The method described in claim 21, wherein said alternating current is three-phase alternating current.

24. The method described in claim 21, wherein said electrical current flow established in said connate salt water elevates the temperature thereof to a preselected temperature range.

25. The method described in claim 24, wherein said elevated temperature range is 180° F. to 212° F.

26. The method described in claim 24, further including the steps of
    recovering thermal energy from said elevated temperature salt water, and converting said thermal energy into electrical and mechanical energy.

27. The method described in claim 26, further including the step of injecting said salt water into a subsurface earth formation after recovering said thermal energy therefrom.

28. The method described in claim 21, further including the step of injecting said separated connate salt water substantially free of hydrocarbon gases into a subsurface earth formation.

29. Apparatus for recovering hydrocarbon gases from hot geopressured salt water, comprising
borehole means for recovering the geopressured salt water from a subsurface earth formation,
container means having a variable interior volume connected to said borehole means for receiving said geopressured salt water at a substantially reduced pressure for releasing and trapping the hydrocarbon gases released therefrom,
agitating means interposed in the path of said geopressured salt water upon entry into said container means for creating turbulence therein for enhancing release of the hydrocarbon gases, and
gas recovery means communicating with said variable interior volume of said container means for recovering said released hydrocarbon gases.

30. The apparatus as described in claim 29, wherein said container means comprises
a generally circular tank having vertical sidewalls and a flexible cover sealingly attached to the upper edges of said side walls about the periphery of said tank, said cover upon full expansion assuming a generally hemispherical shape, and
a plurality of expansion chambers attached to said side walls of said tank and freely communicating with the interior thereof, each of said expansion chambers having disposed therein said agitating means and receiving said recovered geopressured salt water at a substantially reduced pressure.

31. The apparatus described in claim 30, wherein said hot water vapor from said salt water condenses on the inner surface of said flexible cover over said tank, and further includes means disposed in said tank sidewalls adjacent the attachment of said cover and sidewall for collecting said condensed water vapor as fresh water.

32. The apparatus described in claim 29 further including
a plurality of spaced electrodes disposed in said container means adjacent said agitating means in the path of said recovered geopressured salt water and in electrical contact therewith, and
a source of electrical current connected to each of said electrodes for establishing a current flow through said salt water between said electrodes for releasing additional hydrocarbons gases.

33. The apparatus described in claim 32, wherein said container means is electrically insulated from ground potential and further includes a second plurality of spaced electrodes disposed in said insulated container means and in electrical contact with said salt water contained therein and in electrical contact with said source of electrical current for establishing a current flow through said salt water between said electrodes for causing disassociation of additional hydrocarbon gases therefrom.

34. The apparatus described in claim 32 or 33, wherein said source of electrical current is a course of alternating current floating above ground potential.

35. The apparatus described in claim 34, wherein said source of alternating current is a source of three-phase alternating current.

36. The apparatus described in claim 32, further including
pumps for removing the salt water from said variable interior volume container means subsequent to said release of the hydrocarbon gases,
holding means forming a closed container for receiving said pumped salt water from said container means, said holding means being electrically insulated from ground potential,
a second plurality of spaced electrodes disposed in said insulated holding means and in electrical contact with said salt water contained therein,
a second source of electrical current connected to each of said second plurality of electrodes for establishing a current flow through said salt water between said electrodes for causing disassociation of additional hydrocarbon gases therefrom, and
means for recovering said disassociated hydrocarbon gases.

37. The apparatus as described in claim 36, wherein said current flow through said salt water further causes release of free hydrogen and carbon dioxide.

38. The apparatus described in claim 37, wherein said second source of electrical current is a source of alternating current floating above ground potential.

39. The apparatus described in claim 38, wherein the source of alternating current of said second source of electrical current is a source of three-phase alternating current.

40. The apparatus described in claims 33 or 36, wherein said electrical current flow established by said second plurality of electrodes and said salt water elevates the temperature thereof to a preselected temperature range.

41. The apparatus described in claim 40, wherein said elevated temperature range is 180° F. to 212° F.

42. The apparatus described in claim 36, further including energy conversion means connected to said holding means for recovering thermal energy from said elevated temperature salt water and converting said recovered thermal energy into electrical or mechanical energy.

43. The apparatus described in claim 36, further including
separating means for receiving crude oil recovered from a producing oil well for separating connate salt water containing dissolved hydrocarbon gases therefrom, and
transfer means connected to said separating means for discharging said connate salt water into said holding means.

44. The apparatus described in claim 29 or 32, further including pumping means connected to said container means for injecting said reduced pressure salt water substantially free of hydrocarbon gases into said subsurface earth formation.

45. The apparatus described in claim 29, further including
thermal energy conversion means for receiving said geopressured salt water from borehole means and converting said thermal energy into electrical or mechanical energy, and
mechanical energy conversion means for receiving said geopressured salt water from said thermal energy conversion means for converting said mechanical energy of said geopressured salt water into electrical energy prior to application of said salt water to said container means.

46. The apparatus described in claim 29, further including energy conversion means for receiving said hot salt water after release of said hydrocarbon gases therefrom and converting said thermal energy of said salt water into mechanical or electrical energy.

47. The apparatus described in claim 46, further including pumping means for injecting said salt water into said subsurface earth formation after said thermal energy conversion.

48. The apparatus described in claim 29, further including
means for cooling the top of said container means for causing hot water vapor to condense on the inner surface of said container means top as fresh water, and
means cooperating with the inner surface of said container means top for collecting said condensed fresh water.

49. Apparatus for recovering hydrocarbon gases from connate salt water recovered during production of crude oil from a subterranean formation, comprising
a producing oil well having a borehole penetrating said subterranean formation,
separating means for receiving crude oil recovered from said oil well for separating connate salt water containing dissolved hydrocarbon gases therefrom,
pumps for removing the salt water from said separating means,
holding means forming a closed container for receiving said pumped salt water from said separating means, said holding means being electrically insulated from ground potential,
a plurality of spaced electrodes disposed in said insulated holding means and in electrical contact with said salt water contained therein,
a source of AC electrical current connected to each of said plurality of electrodes for establishing a current flow through said salt water between said electrodes for causing disassociation of additional hydrocarbon gases therefrom, and
means for recovering said disassociated hydrocarbon gases.

50. The apparatus as described in claim 49, wherein said current flow through said salt water further causes release of free hydrogen and carbon dioxide.

51. The apparatus described in claim 49, wherein the source of alternating current is a source of three-phase alternating current floating above ground potential.

52. The apparatus described in claim 49, wherein said electrical current flow established by said source of electrical current between said plurality of electrodes and said salt water elevates the temperature thereof to a preselected temperature range.

53. The apparatus described in claim 52, wherein said elevated temperature range is 180° F. to 212° F.

54. The apparatus disclosed in claim 49, further including pumping means connected to said holding means for injecting said reduced pressure salt water substantially free of hydrocarbon gases into said subsurface earth formation.

55. The apparatus disclosed in claim 49, further including energy conversion means for receiving said hot salt water from said holding means after release of said hydrocarbon gases therefrom and converting said thermal energy of said salt water into electrical energy.

56. The apparatus disclosed in claim 55, further including pumping means for injecting said salt water into said subsurface earth formation after said thermal energy conversion.

* * * * *